Figure 1:
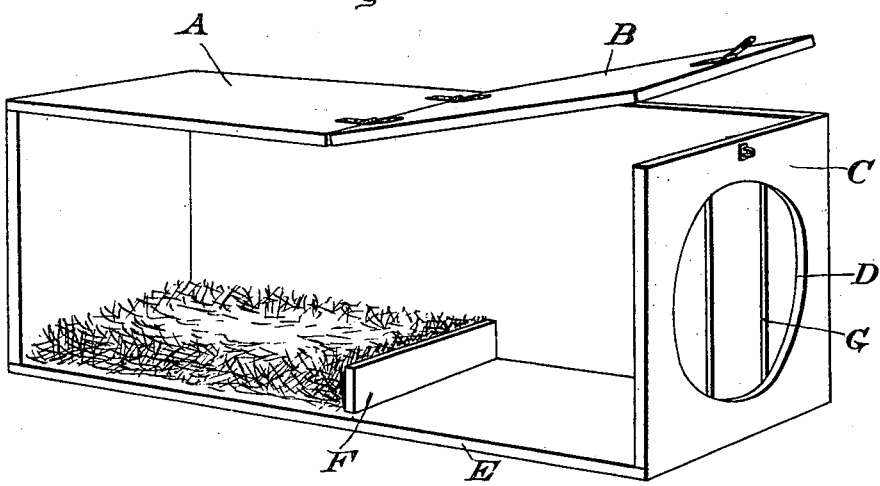

No. 666,504. Patented Jan. 22, 1901.
E. S. FREEMAN.
TRAP NEST BOX.
(Application filed June 6, 1900.)
(No Model.)

Witnesses
Jas. S. Smith
R. Clinton Balinger

Inventor
Edward Storrs Freeman.
By Edwin Guthrie.
Attorney

THE NORRIS PETERS CO., PHOTO-LITHO., WASHINGTON, D. C.

UNITED STATES PATENT OFFICE.

EDWARD STORRS FREEMAN, OF PLAINVILLE, CONNECTICUT.

TRAP NEST-BOX.

SPECIFICATION forming part of Letters Patent No. 666,504, dated January 22, 1901.

Application filed June 6, 1900. Serial No. 19,288. (No model.)

*To all whom it may concern:*

Be it known that I, EDWARD STORRS FREEMAN, a citizen of the United States, residing at Plainville, in the county of Hartford and State of Connecticut, have invented certain new and useful Improvements in Trap Nest-Boxes; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to trap nest-boxes which are used in poultry culture as means for identifying the eggs laid by a particular hen. For example, in pedigree breeding of fancy chickens, where it is desired to keep a record of the progeny of certain fowls possessing superior and valuable characteristics, it is essential that it should be positively known before hatching that the eggs treated are those of the selected hen. To this end boxes are prepared having usually a rearward compartment furnished with a nest and a front portion into which the hen first enters through a doorway that is immediately closed by a door constructed and arranged as a trap and sprung by the hen in passing. Exit is prevented by the trap-door, and the hen must be removed by way of a second door or lid provided in the top or side of the box. It is thus readily determined for record that the egg found in the nest was laid by the particular hen caught in the trap nest-box. All professional poultry-raisers and practically all farmers have numbers of these trap-boxes, and trouble is continually experienced with the trap mechanisms. These contrivances either refuse to operate easily or present a forbidding appearance and cause the hen to hesitate or decline altogether to enter the trap. Furthermore, many of the trap mechanisms now in use require a box of some special form, and nearly all of these devices known to me are of such character and extent that in a majority of instances the attendant, particularly if he or she is a non-mechanical person, meets with unusual difficulty in attaching them to an old box.

The object of my invention is to overcome the disadvantages stated and to provide a trap nest-box having a trap mechanism especially designed to be used in connection with any of the ordinary forms of trap nest-boxes.

If the purchaser does not desire to buy the entire invention—that is, the box and trap mechanism combined—he can take the latter elements alone, as it is my intention to put up my peculiar trap mechanism for sale separately, this being also an object of my invention, its extreme simplicity rendering it perfectly easy of attachment and adjustment by any unskilled man or woman.

Each constituent part of my invention is described in detail and its individual office, together with the mode of operation as a whole, fully explained hereinbelow.

Figure 2:
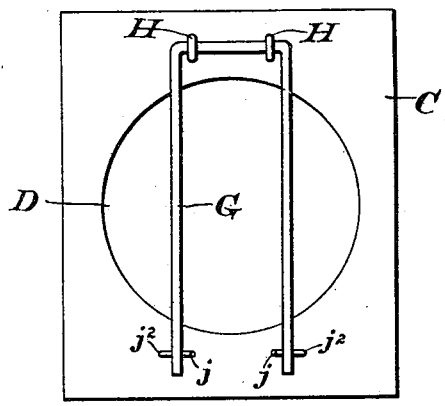

Referring to the accompanying drawings, throughout which like letters designate like parts, Figure 1 represents a perspective view of the box with one side removed to show the interior construction. In this view the lid or door by which the fowl is most easily taken from the box is shown slightly raised. Fig. 2 represents a rear view of the front wall of the box, showing the customary manner of hanging the door-rods; and Figs. 3 and 4 are top plan views of the spring-catches, and in these figures a section of the door-rods appears to illustrate the positions of those parts before and after the trap has been sprung.

Letter A marks the box. It possesses a hinged lid B, as shown, and also a front wall C, having a doorway D, in this instance consisting of a circular opening. The form of the opening is not material. Upon the bottom E of the box is erected a low partition F, dividing off the nest-chamber in the rear. The partition is low enough for the hen to step over.

In Fig. 2 are best seen the door-rods, more exactly a door or gate made by bending an iron rod of suitable weight into a U-shaped form. This rod-gate is designated by letter G and is pivotally suspended by staples H H from a point over the entrance, as drawn. With the rods alone across the doorway the hen can readily see into the box, and as the nest is in full view and the interior light and airy she enters without hesitation. It is my object to cut off as little as possible of the light entering the box and still interpose a gate of sufficient strength for the purpose. The U-shaped form has been found to answer admirably, as it does not present the appearance of a barrier. The rods are near enough to each other and to the sides of the doorway to prevent the hen from forcing her body out after the trap has been sprung.

Figures 3, 4:
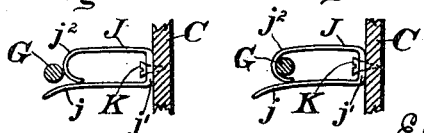

Figs. 3 and 4 show the preferred form of spring-catch, although other forms might obviously be substituted. The catches are identically the same in construction and operation. Each comprises a strip J of light spring metal, having a curved side $j$ with a projecting extremity, a straight base $j'$, through which is drilled a screw-hole, (not shown,) and a hook side $j^2$. These catches are fixed to the front interior wall of the box by screws K K and are so placed below the doorway that before the trap is sprung the rods will rest outside the catch, but between its ends or lips, as shown in Fig. 3. As the hen passes into the box she raises the rods, which upon falling engage the catches, as plainly shown in Fig. 4. Thereafter it is quite impossible for the hen within to escape or for another hen to enter and disturb the first. When the inmate has deposited her egg and comes forward into the front portion or standing-room, she cuts a great deal of the light off from the nest-chamber, and this reduces the liability of her returning to the nest and breaking and eating the egg, as occasionally happens.

The trap mechanism of my invention being once set up needs no further attention other than releasing the ends of the rods from the catches when the hen is taken out. Its parts are believed to be so simple that any one can adjust and arrange them upon a different box, provided the entrance is or can be made of proper size.

Having thus described my invention, what I claim, and desire to secure by Letters Patent of the United States, is—

A trap nest-box having a front wall provided with a suitable doorway, a door formed of a U-shaped metal rod pivotally suspended, spring-catches attached to the inner surface of the said front wall below the doorway and arranged to receive the door-rods, each catch having a convergent mouth and an interior hook formation, the said convergent mouth guiding the door-rods into the catch and the said interior hook preventing the door being rearwardly opened, substantially as described.

In testimony whereof I affix my signature in presence of two witnesses.

EDWARD STORRS FREEMAN.

Witnesses:
H. MANNING CLAYTON,
J. GEORGE WHITE.